Nov. 24, 1959 A. F. BOFF 2,914,670

FREQUENCY SELECTIVE CIRCUIT

Filed Dec. 30, 1955

INVENTOR.
ALBERT FRANK BOFF

BY Lippincott & Smith

ATTORNEYS

United States Patent Office 2,914,670

Patented Nov. 24, 1959

2,914,670

FREQUENCY SELECTIVE CIRCUIT

Albert Frank Boff, Montreal, Quebec, Canada, assignor to Beckman Instruments, Inc., Fullerton, Calif., a corporation of California Application December 30, 1955, Serial No. 556,603

14 Claims. (Cl. 250—27)

This invention relates to frequency selective circuits and particularly to frequency selective circuits which may be used to analyze a complex waveform, or to give one or more outputs dependent upon the frequency or the amplitude and frequency of components present in such waveforms, or both.

One of the outstanding characteristics of the invention herein is its ability to effectively discriminate between closely spaced frequencies, employing as a variable selective element only a simple, conventional tuned circuit. The invention herein results in an effective increase in the Q of such a simple variable tuned circuit from the usual value of perhaps thirty or forty to a value of several thousand or more.

There are a number of equipments which, in a given circuit, may serve an analogous function. For example, a multiple section filter having one or more of the tuning elements variable in each section may give high selectivity. However, such equipments are unwieldy, and, due to manufacturing tolerances and other limitations, often not suitable to obtain the desired selectivity or Q for more than a narrow range of frequencies. Another circuit or equipment giving high selectivity is the well-known superheterodyne in which a variable local frequency is intermodulated with the input frequency to produce a constant sum or difference frequency which is then amplified in one or more intermediate frequency stages having fixed tuning. A selecting function is also served by equipment described by L. R. M. Vos De Wael on pages 807–812 of vol. 40 of the Proceedings of the IRE (July 1952). In the equipment there described, double modulation, in conjunction with a fixed frequency band-pass filter and a fixed frequency low-pass filter, is employed to select desired harmonic frequencies from a complex waveform. No variable tuned circuit is employed, the local oscillator or "search generator" serving, in conjunction with the aforementioned selective filters, to select the particular harmonics desired.

It is an object and advantage of the invention herein to provide a sharply selective circuit wherein the variable element is a tuned filter. Another object and advantage of the invention is to provide a circuit which may be caused to function as a driven oscillator having an output amplitude dependent upon the excitation or driving amplitude. It is also an object of the invention to provide a circuit which may be used to select various frequency components present in a complex waveform, such as, for example, the harmonics present in such a waveform, and to give one or more outputs in accordance therewith.

Another object of the invention is to provide means for the development of oscillations having their frequency precisely controlled by frequency components present in an input waveform, and which oscillations will exist only so long as a certain level of amplitude of such frequency components is present in said input waveform.

Further objects and advantages of the invention are to provide a circuit which may be used to measure both the frequency and level of components present in an input waveform. The term "input waveform" as used herein is intended to include any waveform, simple or complex, which may be introduced on the input. Various other objects and advantages of the present invention will occur to those skilled in the art from the specification and drawing herein.

Broadly considered, the apparatus of the invention is a driven oscillator, the essential elements whereof comprise a fixed-frequency local oscillator, a primary selective circuit sharply tuned to the local oscillator frequency, a secondary selective circuit which is (for most purposes for which the apparatus is employed) variable, and which can be quite broadly tuned, and three modulators, one of which must be of the balanced type and all of which may be either single- or double-balanced. The input wave may have any waveform but usually the waveform is complex, such as that representing fundamental and harmonic frequencies or a carrier and sideband frequencies, only one frequency $F_x$ of the complex appearing measurably in the output wave.

A portion of the output of frequency $F_x$ is combined in one of the modulators with the output of the fixed frequency oscillator to produce the usual plus-and-minus sidebands of the oscillator frequency $f$. These sideband frequencies are intermodulated with the input wave in a second of the modulators. Since the frequency $F_x$ is by definition one component of the input wave, one of the resultant modulation products is the frequency $f$ of the local oscillator, and this is selected from the other modulation products by the primary selective circuit and supplied to one input circuit of the third modulator. Here it is intermodulated with another portion of the output of the first modulator, from which it subtracts to provide the desired output frequency $F_x$. The secondary selective circuit is tuned to the desired frequency and determines which component is chosen.

The use of at least one balanced circuit in the modulators employed permits connections wherein undesired input frequencies are balanced out, particularly the local oscillator frequency $f$, except as the latter frequency appears as a modulation product and not as an input. Since the device as a whole is an oscillator the gain around the loop, from complex-wave input to output and back to input must be unity; this can be attained by using amplifying modulators or by inserting a separate amplifier somewhere in the loop. The secondary selective circuit being tuned to frequency $F_x$, the oscillator will stabilize with the loop gain at unity for this frequency, and since the gain at any other frequency will be less, parasitic frequencies will not, in general, occur. Any other frequencies which may appear in the output will be due primarily to failure to obtain balance in the modulators employed and these frequencies will in general be difference frequencies lower than $F_x$. A high-pass filter in the final output circuit may be used to remove them if desired.

The invention will be better understood by reference to the following detailed description and the drawing, wherein.

Figure 1:
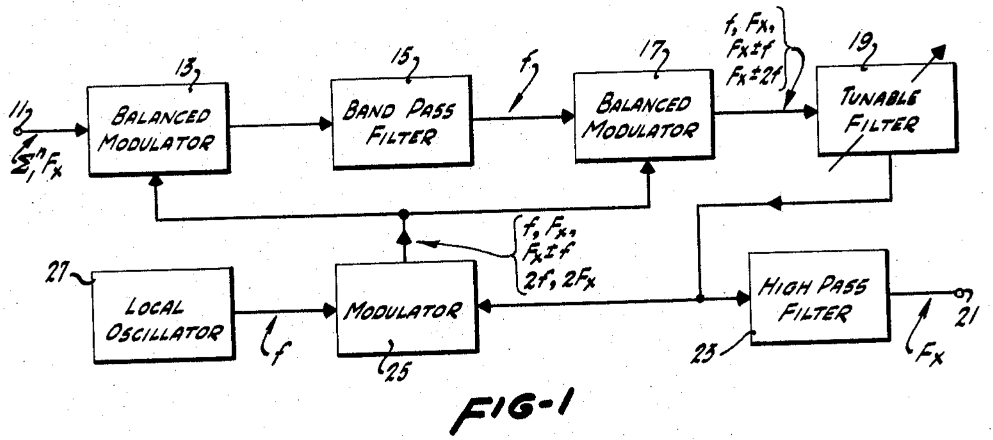
Fig. 1 is a schematic block diagram of an embodiment of the invention arranged to select desired component frequencies from a complex waveform.

In the embodiment of the invention of Fig. 1 an input waveform, one component frequency whereof is to be selected, is supplied through input terminal 11 of the apparatus to one input circuit of a balanced modulator 13. The output circuit of this modulator connects through a narrow bandpass or "slot" filter 15 to one input of a second balanced modulator 17. Modulators 13 and 17 may be of either the single-balanced or double-balanced type; if single-balanced the connections thus far described are to the unbalanced input circuits.

The output circuit of modulator 17 connects through a tunable filter 19 adapted to select the desired component of the complex input wave, after which the circuit divides, one branch leading to the output terminal 21 of the apparatus. A high-pass filter 23, whose function will be discussed below, may be connected in this branch of the circuit. It will readily be appreciated by those familiar with the art that other forms of output circuitry and output indication are possible.

The second branch circuit from filter 19 connects to one input circuit of a third modulator 25, which may be either balanced or unbalanced. Its other input circuit is supplied from a fixed frequency oscillator 27, preferably stabilized as to frequency, as by a crystal control. The frequency of the local oscillator may be more or less arbitrarily chosen, but it must be the same as that passed by the filter 15, and to insure this the filter may conveniently be of the crystal type. The output circuit of modulator 25 is connected to supply the second, balanced input circuits of both modulators 13 and 17.

The various frequencies present in the different portions of the circuit of Fig. 1 when it is being used to select high order harmonics from a complex waveform have been indicated by arrows pointing to such portions of the circuit, it being understood that this use is only one of the possible uses of the circuit. For the sake of simplicity, only the frequencies present in appreciable amounts have been indicated. The designation $\Sigma^n{}_1F_x$ designates the complex waveform at the input, which has harmonics from 1 to $n$ of a fundamental frequency F. Similarly, $f$ indicates the local oscillator frequency, and $F_x$ the harmonic which is being tuned or selected by tunable filter 19.

In the operation of the circuit of Fig. 1, tunable filter 19 is adjusted to a desired harmonic $F_x$ from among the harmonics present in the complex waveform $\Sigma^n{}_1F_x$. When the circuit is oscillating, $F_x$ will be generated in balanced modulator 17 and will appear at the input of tunable filter 19, as will appear more fully hereinafter. Applied to the other input of modulator 25 is the frequency $f$ being generated by local oscillator 27. Accordingly, the frequencies $f$, $F_x$ and $f+F_x$ all appear at the output of modulator 25, unless modulator 25 is of the balanced type, in which case $f$, $F_x$ or both will be eliminated, depending upon which frequency is supplied to the balanced circuit of a single-balanced modulator or if a double-balanced modulator is used in this position.

In any case the frequencies $f-F_x$ and $f+F_x$ both appear in the output of modulator 25, and are intermodulated, in modulator 13, with all of the frequencies present in the input wave, including, in particular, the frequency $F_x$. Among the modulation products thus produced are $(f-F_x)+F_x$ and $(f+F_x)-F_x$, both equal to $f$. Any component $f$ in the output of modulator 25 is balanced out in the output of modulator 13, and since modulation is a process of multiplication the amplitude of the component $f$ at the output of modulator 13 is proportional to the amplitude of component $F_x$ at its input. Frequencies $f+F_x$ are also balanced out, but this is relatively unimportant, since all modulation products except the frequency $f$ are removed by the band-pass filter 15. The efficacy of the apparatus in deliverying pure waveforms of single frequencies depends primarily on the degree to which filter 15 removes undesired components, which is why its tuning should be very sharp and its pass-band very narrow. As stated at the outset of the description of this invention this filter is the primary selective circuit of the invention, but since its tuning is fixed and not subject to adjustment in selecting various components of waves to be analyzed it can be made as sharp as desired or necessary.

The substantially pure frequency $f$ is therefore supplied to modulator 17, to be intermodulated with the frequencies $f-F_x$ and $f+F_x$ from modulator 25. These latter frequencies are effectively balanced out in modulator 17, since they are supplied to its balanced input, and among the components in its output that which dominates is $F_x$, which is selected by tunable filter 19, and as stated above is the only frequency fed back at high enough level to maintain oscillation.

As in all apparatus employing regenerative modulation, there must be some component of frequency $F_x$ in the input of modulator 25, and hence in the output of modulator 17, before oscillation can start. Oscillation can be initiated in several ways; the shock of closing a switch, or the inherent noise in the circuit may be sufficient, or a temporary contact between the input and output circuits will introduce enough frequency $F_x$ into the system to build up through the regenerative action to oscillation.

Figure 2:
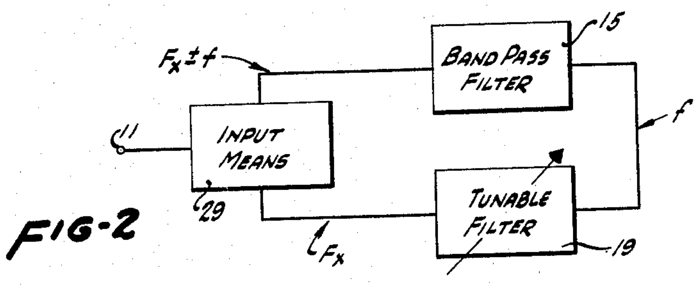
Fig. 2 is a diagrammatic representation of the oscillatory loop of Fig. 1.

The action of the circuit of Fig. 1 may be better understood by reference to Fig. 2, which is an abbreviated diagrammatic representation of the oscillatory loop of Fig. 1. In Fig. 2 only the selective and driving elements have been shown. The components of Fig. 2 corresponding to the components of Fig. 1 have been designated by the the same numerals. In Fig. 2, the oscillatory loop is comprised of band-pass filter 15, which passes frequency $f$, tunable filter 19, which passes a frequency $F_x$, and the input or driving means 29 which creates the third frequency or more properly, pair of frequencies present in the oscillatory loop, $F_x+f$. The input or driving means 29 may be taken to represent all three of the modulators and the local oscillator of Fig. 1.

It is apparent from Fig. 2 that for oscillation the loop gain must be unity, and it is also apparent that the frequency determining elements are band-pass filter 15 and tunable filter 19.

Returning to Fig. 1, it will be noted that the loop gain is dependent on the characteristics of the individual components comprising the loop, i.e., balanced modulators 13 and 17, band-pass filter 15, tunable filter 19, modulator 25, and, in addition, is dependent upon the level of the desired harmonic $F_x$ present on input terminal 11 (with most types of balanced modulator 13) and the level of oscillation furnished by local oscillator 27 to modulator 25 (with most types of modulator 25). No amplifier has been shown in the loop, but such an amplifier may be desirable or necessary, if the particular combination of loop components first mentioned does not furnish the requisite gain. Such an amplifier may be inserted at any point in the loop, but if inserted merely to give gain to the loop and not for isolation outputs or other purposes, it preferably is included between the output of balanced modulator 13 and the unbalanced input of balanced modulator 17, since in this position the amplifier does not encourage unwanted oscillation in the various local loops present in the circuit. Such a local loop, tending to oscillate at the frequency $F_x$, for example, includes the balanced input of modulator 17, tunable filter 19 and modulator 25. Another such local loop, tending to oscillate at the frequency $f$, is made up of the balanced input of balanced modulator 13, band-pass filter 15, the unbalanced input of balanced modulator 17, tunable filter 19, and modulator 25.

The existence of the local oscillatory loops such as defined hereinabove constitute a reason for requiring modulators 13 and 17 to be of the balanced type. Thus it will be noted, as will be discussed more fully hereinafter in connection with Fig. 3, that modulator 25 may be of the balanced type, and, provided that there is sufficient isolation between modulators 13 and 17, the latter may be of the unbalanced type. Various other modifications and adaptations of the circuit of Fig. 1 within the scope of the invention herein, are possible, and some of these modifications and adaptations will be discussed hereinafter in connection with Fig. 3.

The most selective element in the circuit of Fig. 1 is band-pass filter 15. Band-pass filter 15 may readily consist of half a dozen sections or be crystal controlled, since the frequency $f$ it is designed to pass is fixed. The Q of tunable filter 19 is small by comparison, and tunable filter 19 merely serves to pick out the correct sideband frequency from a group of relatively widely spaced sideband frequencies generated in balanced modulator 17. Conventional definitions of the dynamic rise in Q assume linear circuits, whereas in the circuit of Fig. 1 the selectivity is itself critically dependent upon level. At the threshold of oscillation the loop gain is, of course, unity, so for our purposes it may be justifiable to disregard the feedback and take the Q of the band-pass filter 15 as the effective Q of the entire circuit. This figure for Q would also line up with the effective rejection of adjacent components during measurements in embodiments of the invention arranged for such measurements as will be hereinafter described.

It should also be mentioned in passing that amplifiers may be used in the circuit to make the loop gain either more or less dependent on various of the factors determining loop gain mentioned hereinabove. For example, with conventional types of balanced modulator 13, an amplifier connected in the loop immediately following balanced modulator 13 will make the loop gain more dependent on input level than the same amount of amplification introduced, for example, immediately following tunable filter 19.

Figure 3:
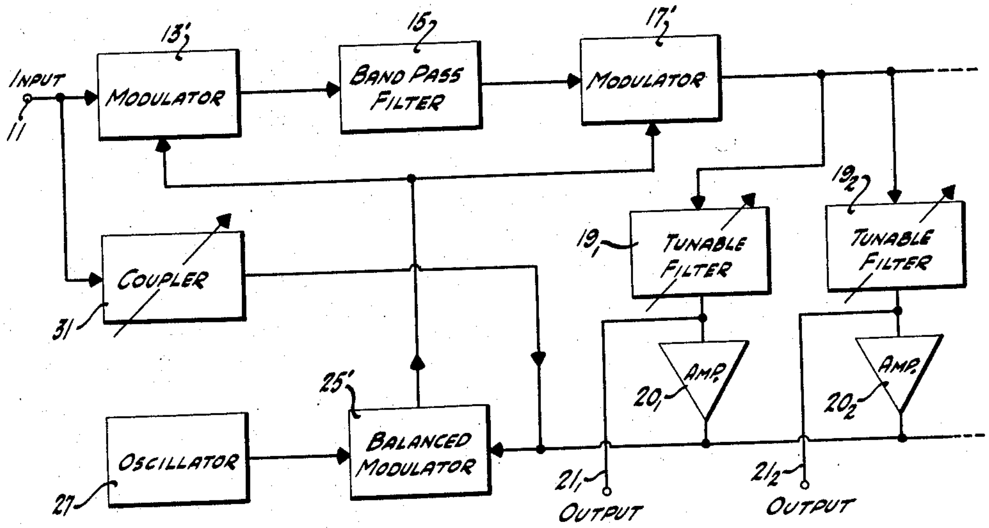
Fig. 3 is a schematic block diagram showing an embodiment of the invention arranged to measure several component frequencies present in a complex waveform.

Turning now to Fig. 3, wherein the same numerals have been used to designate the same components as in Figs. 1 and 2, an embodiment of the invention which may be used to measure the frequency and the amplitude of the various frequency components making up an input waveform is depicted. Up to and including amplifier 17' the elements are as described in connection with Fig. 1, except that the modulators 13' and 17' may be unbalanced as to both of their input circuits.

The output of modulator 17' connects to a plurality of tunable selective circuits, two, $\mathbf{19}_1$ and $\mathbf{19}_2$ being shown, each tuned to a different desired component of the input wave. Amplifiers $\mathbf{20}_1$ and $\mathbf{20}_2$ following the tunable circuits, serve both to amplify the selected components, giving the necessary loop gain, and to isolate the output terminals $\mathbf{21}_1$ and $\mathbf{21}_2$ of the apparatus.

The outputs of amplifiers $\mathbf{20}_1$ and $\mathbf{20}_2$ connect to one input circuit of a third modulator 25' which, in the embodiment of Fig. 3, is of the balanced type. Its other input circuit is supplied from the fixed frequency oscillator 27. The output circuit of modulator 25' is connected to supply the second input circuits of both modulators 13' and 17'.

A coupler 31 is connected between input 11 and one of the inputs of balanced modulator 25'. Coupler 31 is shown connected to the same input of balanced modulator 25' as the output of the amplifiers $\mathbf{20}_1$ and $\mathbf{20}_2$. However, it may be connected instead to the other input of balanced modulator 25' in common with the output of oscillator 27, or to any portion of the loop between the output of modulator 17' and the first mentioned input of balanced modulator 25' and the circuit will continue to operate as described herein. Balanced modulator 25' eliminates the frequencies $f$ and $F_x$ introduced via its balanced input from among the components present in its output, serving to effectively open the local oscillatory loops, and may be either single or double-balanced.

It will be noted that with respect to each branch circuit comprised of a tunable filter 19 and amplifier 20 that a complete oscillatory loop exists, the various frequencies present in such loop being first the frequency to which tunable filter 19 is tuned, as for example, $F_x$, and then, as before, $f \pm F_x$ and $f$.

Coupler 31 is provided in order that the circuit of Fig. 3 may conveniently be used for the measurement of the amplitude of the various component frequencies present in the input waveform. Coupler 31 may take any one of a considerable variety of forms. For example, it may be a variable resistance. It may also be a transformer, a capacitance, an inductance, a unidirectional element such as a diode, or an amplifier, or any combination of the foregoing, and may vary either the amplitude or the phase of the signal it is designed to pass. In any case, coupler 31 introduces in varying amounts to the balanced input of balanced modulator 25' the particular component or components being tuned by the various tunable filters 19. For example, a particular frequency $F_x$ tuned by the first tunable filter 19, insufficient in amplitude without coupler 31 to cause oscillation, is introduced in increasing amounts by coupler 31 to balanced modulator 25' until oscillation takes place. Then, by reference to a previously established "threshold of oscillation" the level or amplitude of the component frequency $F_x$ is established. Alternatively, or in addition to the foregoing method, the level may be measured by decreasing the coupling furnished by coupler 31, after oscillation has been established, to a point where oscillation is no longer sustained, and noting the setting of coupler 31 necessary to accomplish such a discontinuance of oscillation. The latter method is not as likely to be influenced by noise in the loop as the former method. It is a characteristic of the various oscillatory embodiments of the invention that a much larger input amplitude is required to initiate oscillation than to maintain it. In other respects, the operation of the circuit of Fig. 3 is the same as that already described in connection with Fig. 1.

Another alternative method of measurement of the amplitudes of the various components present in the complex wave at the input with the circuit of Fig. 3 requires measurement of the level of the output while the circuit is in a non-oscillatory condition. At least two variations of this method are available. First, the level may be noted with the coupler 31 at a fixed position at which position the amounts necessary to produce various outputs have previously been noted. Several such fixed settings would of course give several "ranges" readable on the output meter. Another variation of this method requires variation of the coupler 31 to give a predetermined level of output, at which output the various settings of coupler 31 necessary to give such output are known and give, accordingly, an indication of the input level of the particular component.

In the discussion hereinabove, coupler 31 has been the variable element, but the circuit allows variation of the loop gain as well. Hence, the loop gain may be varied with the gain of coupler 31 held constant to give any of the measurements noted hereinabove. For that matter, both the loop gain and the gain of coupler 31 may be varied to give measurements. Considering the number of ways in which the loop gain may be varied, some of which ways have already been mentioned, it is apparent that considerable latitude exists for any given set of circumstances in the particular method employed. The circuitry for a given application will depend on such factors as the ranges of frequencies to be measured, the amplitudes to be measured within such ranges, and the particular components employed as modulators, tuners, etc. The circuit of Fig. 3 is analogous to a variable coupler having a variable frequency selective positive feedback path.

Various outputs other than the component frequencies may be desirable and are readily obtainable. For example, neon lights may be used to indicate oscillation in any of the loops.

It will also be noted that the same considerations as to the choice of the fixed frequency $f$ apply to the circuit of Fig. 3 as applied to the circuit of Fig. 1. The frequency $f$ may, of course, be varied in fixed steps to give various frequency measuring ranges. Each time the frequency $f$ is so varied it is necessary to substitute an appropriate band-pass filter 15 for the particular frequency $f$ employed. The frequency $f$ of the local oscillator 27 and the band-pass filter 15 in any case must be such that the frequency components present on input terminal 11 do not occur at the sub-harmonics of the frequency *f*, or cause intermodulation products in modulator 13' at such frequency.

Two or more circuits such as shown in Fig. 1 or Fig. 3 may be connected in tandem to give a selectivity which is the sum of their individual selectivities. However, since the band-pass filter 15 may readily have its sections increased to give similar increases in selectivity, tandem connections of complete circuits is a somewhat cumbersome method for reaching this result.

It is also possible to use tuned traps in the local oscillatory loops to discourage unwanted oscillation in addition to or in place of the balanced modulators described hereinbove.

A considerable number of variations of the basic circuitry of the invention have been mentioned in connection with the description herein, and still further such adaptations and modifications are possible and will occur to those skilled in the art. The invention, accordingly, is to be limited only insofar as it is limited in the following claims.

What is claimed is:

1. The method of generating oscillations of a frequency exactly controlled by a component frequency present in an input waveform comprising the steps of generating an intermediate frequency shifted from said component frequency a known amount, comparing said intermediate frequency with said input waveform to generate a beat frequency equal to said known amount, and algebraically adding said beat frequency and said intermediate frequency to generate a frequency equal to said component frequency for employment in said first-named step to generate said intermediate frequency.

2. The method of identifying a component frequency constituting at least part of an input waveform comprising the steps of algebraically adding a known frequency to said component frequency to produce an intermediate frequency, intermodulating said intermediate frequency with said input waveform, selecting the sideband frequency produced by said intermodulation, which is equal to said known frequency, intermodulating said selected sideband frequency with said intermediate frequency and selecting from the sideband frequencies produced by said last-named intermodulation the frequency equal to said component frequency, said frequency so selected being used to produce said intermediate frequency in said first-named step.

3. The method of selecting a particular component frequency from among the frequencies constituting an input waveform comprising the steps of heterodyning said input waveform with an intermediate frequency differing from said component frequency by a fixed amount, selecting from the products of said heterodyning the beat frequency produced thereby which is equal to said fixed amount, heterodyning said beat frequency so selected with said intermediate frequency, selecting from the products of said last-named heterodyning the frequency equal to said component frequency, and heterodyning said last-named selected frequency with a local fixed frequency to produce said intermediate frequency.

4. The method of measuring the level of a component frequency present in an input waveform comprising the steps of selecting from a plurality of frequencies a frequency equal to said component frequency, intermodulating said frequency so selected with a locally generated fixed frequency to produce frequencies which are the algebraic sum of said frequencies and said fixed frequency, intermodulating said sum frequencies with said input waveform, selecting from the output of said intermodulation a second selected frequency equal to said locally generated fixed frequency, and intermodulating said second selected frequency with said sum frequencies to produce the plurality of frequencies from which said frequency equal to said component frequency first mentioned is selected, the amount of signal in at least one of the foregoing steps being variable whereby said level is determinable according to the oscillatory condition produced as a result of said variation.

5. The method of producing an output frequency exactly equal to a component frequency present in a waveform comprising the steps of generating a local fixed frequency, producing an intermediate frequency which is the algebraic sum of said local fixed frequency and a frequency equal to said component frequency, intermodulating said intermediate frequency with said waveform, selecting from the products of said intermodulation a frequency which is equal to said fixed frequency, intermodulating said selected frequency with said intermediate frequency, selecting from the products of said second intermodulation a frequency equal to said component frequency in said waveform, said frequency so selected being employed both to produce said intermediate frequency in said second-named step and to furnish said output frequency.

6. The method of measuring the level of a component frequency included in an input waveform comprising the steps of intermodulating a portion of said input waveform with a fixed locally generated frequency to produce intermediate frequencies which are the algebraic sum of said locally generated frequency and said component frequency, intermodulating said intermediate frequencies with said input waveform to produce first sideband frequencies, selecting from said first sideband frequencies the frequency equal to said locally generated frequency, intermodulating said selected frequency with said intermediate frequencies to produce second sideband frequencies, selecting from said second sideband frequencies a frequency equal to said component frequency, intermodulating said component frequency so selected with said locally generated frequency to additively combine its effect with said first mentioned intermodulating step, thereby determining the level of said component frequency in said input waveform.

7. An oscillator driven by an input frequency comprising a variable filter adjustable to the input driving frequency, means connected to said filter to shift the output of said filter a fixed amount, a modulator connected to said means for intermodulating said shifted frequency with said driving frequency, a fixed filter for selecting a beat frequency equal to the amount of said frequency shift, and a modulator connected to said means and said fixed filter for intermodulating said beat frequency and said shifted frequency to produce an input to said variable filter.

8. A circuit for detecting the presence of an input frequency included in a waveform comprising, in combination, means for generating a fixed frequency, a circuit connected with the output of said means for algebraically adding said fixed frequency to the input frequency, means connected to said circuit to intermodulate the output of said circuit with said waveform, a band-pass filter connected to said intermodulating means to select one of the frequencies produced by said intermodulating means, means connected to said band-pass filter and to the output of said circuit for intermodulating the frequency selected by said band-pass filter with the output of said first-named circuit, and a variable filter connected between said last-named intermodulating means and an input to said first-named circuit for selecting said input frequency.

9. An apparatus for selecting at least one of the component frequencies present in a complex waveform comprising a first modulator for intermodulating said waveform with an intermediate frequency to produce first sideband frequencies, a band-pass filter connected to the output of said first modulator for selecting from said first sideband frequencies a frequency which is the difference between said component frequency and said intermediate frequency, a second modulator connected to the output of said filter for intermodulating said selected frequency and said intermediate frequency to produce second sideband frequencies, a variable tuner connected to the output of said second modulator for selecting from said second sideband frequencies the frequency which is equal to said component frequency, and a third modulator having inputs connected between said tuner and said filter for intermodulating the component frequency so selected with said difference frequency to produce said intermediate frequency.

10. A circuit for the analysis of an unknown waveform comprising a first modulator, connections for applying said unknown waveform to said first modulator, a second modulator, a band-pass filter connecting the output of the first modulator to an input of the second modulator, a third modulator, a variable filter connecting the output of said second modulator to an input of said third modulator, connections for applying a fixed frequency to another input of said third modulator, and connections for applying the output of said third modulator simultaneously to an input on said first modulator and an input on said second modulator.

11. A circuit responsive to component frequencies present in a complex waveform comprising, in combination, a local oscillator, a modulator having one of its inputs connected to said local oscillator and its output connected to an input of each of two balanced modulators, connections for applying said complex waveform to the other input of one of said balanced modulators, a band-pass filter tuned to the frequency of said local oscillator connecting the output of a first of said balanced modulators to the other input of the second of said balanced modulators and at least one variable filter connecting the output of said second balanced modulator to the other input of said first-named modulator.

12. A circuit for the analysis of an input waveform comprising, in combination, a first, a second, and a third modulator, said first modulator being of the balanced type, connections for applying a signal of known local frequency to an input of said balanced modulator, connections for applying said input waveform to one input of said second of said modulators, means for applying the output of said balanced modulator to an input of said second and third modulators, a band-pass filter tuned to said local frequency connecting the output of said second modulator to an input of the third of said modulators and a variable tuner adjustable to said component frequency connecting the output of said third modulator to the other input of said balanced modulator.

13. A circuit for the selection of high order harmonics from a complex waveform comprising, in combination, means to generate a local fixed frequency differing from any of the harmonic frequencies present in said complex waveform, a modulator connected to said means for algebraically adding said fixed frequency to a developed frequency equal to a selected harmonic present in said complex waveform, two balanced modulators each having a first input connected to the output of said first-named modulator, connections for applying said complex waveform to a second input on the first of said balanced modulators, a band-pass filter connected between the output of said first balanced modulator and a second input on said second balanced modulator for selecting a frequency produced in said first balanced modulator equal to said local fixed frequency, a variable filter for selecting from the frequencies generated in said second balanced modulator, a frequency equal to said selected harmonic, said frequency equal to said selected harmonics being applied to said first-named modulator to complete an oscillatory loop, and a band-pass filter connected to said variable filter whereby oscillatory energy at said selected harmonic frequency is produced at the output thereof.

14. A circuit for the analysis of an unknown waveform comprising a first modulator, connections for applying said unknown waveform to said first modulator, a second modulator, a band-pass filter connecting the output of the first modulator to an input of the second modulator, a third modulator, a variable filter connecting the output of said second modulator to an input of said third modulator, connections for applying a fixed frequency to another input of said third modulator, connections for applying the output of said third modulator simultaneously to an input on said first modulator and an input on said second modulator, and variable coupling means interconnecting said first mentioned connections to the input of said third modulator that is connected to said variable filter.

References Cited in the file of this patent

UNITED STATES PATENTS

| | | |
|---|---|---|
| 2,358,152 | Earp | Sept. 12, 1944 |
| 2,369,663 | Dennis et al. | Feb. 20, 1954 |
| 2,582,768 | Colas | Jan. 15, 1952 |
| 2,617,985 | Collins | Nov. 11, 1952 |

UNITED STATES PATENT OFFICE

Certificate of Correction

Patent No. 2,914,670 November 24, 1959

Albert Frank Boff

It is hereby certified that error appears in the printed specification of the above numbered patent requiring correction and that the said Letters Patent should read as corrected below.

Column 3, lines 46 and 63, for "$f+F_x$", each occurrence, read —$f \pm F_x$—; line 66, for "deliverying" read —delivering—.

Signed and sealed this 17th day of May 1960.

[SEAL]

Attest:

KARL H. AXLINE,
*Attesting Officer.*

ROBERT C. WATSON,
*Commissioner of Patents.*